J. W. RENO.
TOOTHED GEAR POWER TRANSMISSION.
APPLICATION FILED JULY 22, 1918.

1,314,701.

Patented Sept. 2, 1919.
2 SHEETS—SHEET 1.

Jesse W. Reno.
Inventor

By his Attorney

L. H. Campbell

UNITED STATES PATENT OFFICE.

JESSE W. RENO, OF NEW YORK, N. Y.

TOOTHED-GEAR POWER TRANSMISSION.

1,314,701.　　　　　Specification of Letters Patent.　　Patented Sept. 2, 1919.

Application filed July 22, 1918. Serial No. 245,985.

*To all whom it may concern:*

Be it known that I, JESSE W. RENO, a citizen of the United States, residing in New York, in the county of New York and State of New York, have invented a new and useful Improvement in Toothed-Gear Power Transmissions, of which the following is a specification.

My invention relates to a new and useful improvement in reduction gears in toothed-gear transmissions; and it is especially adapted to staggered spur gear driving mechanism as, for example, toothed gear turbines. By my invention it is practicable to maintain in satisfactory operation, a staggered spur gear power transmission drive which will run smoothly and almost noiselessly. It has been very difficult heretofore to make a successfully operable staggered power gear drive because it is practically impossible or virtually impracticable to set the staggered gear teeth of the drive gear to register accurately with the staggered gear teeth of the driven gear. In my invention, the teeth on the drive gear can accommodate themselves in operation to inaccuracies of the teeth on the driven gear. Gears made up of staggered straight teeth, in accordance with my invention, will be free from the friction due to side thrust in operation that is found in spiral or herring-bone gears; furthermore, my invention takes care of defects or inaccuracies in the alinement of the shafts on which the gears are mounted.

I will now proceed to describe my invention.

In the accompanying drawings, Figure 1 is a view in side elevation, partly in section, of the drive gear of my invention.

Figure 5:
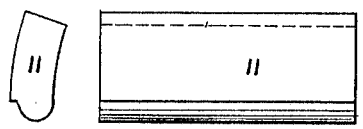

Fig. 5 comprises views of the end and side of one of the pressure bars.

Figure 6:
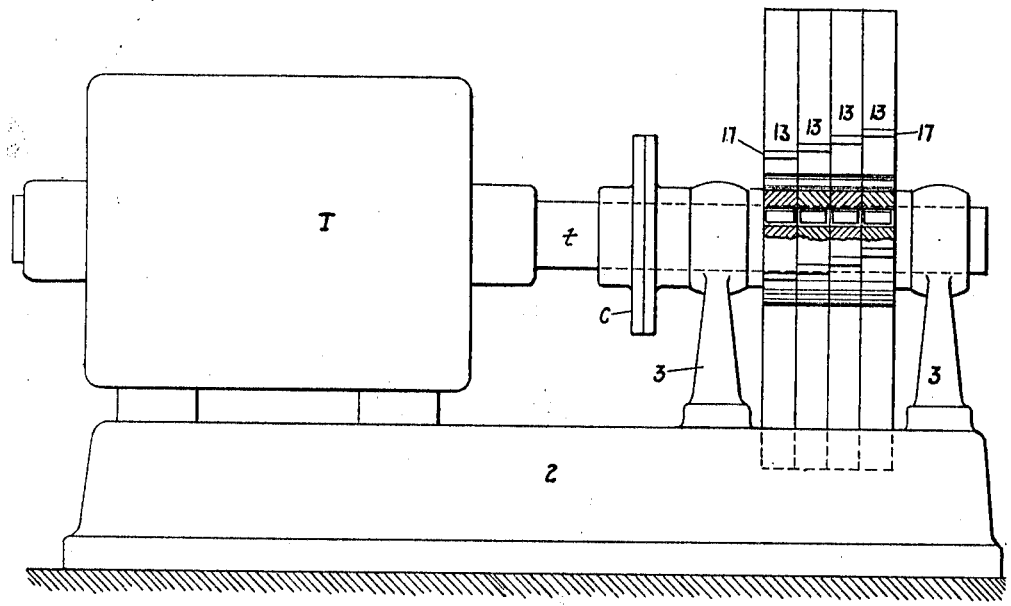

Fig. 6 is a side view partly in section of my invention of staggered toothed gears and spring keys, securing the drive gear to a shaft.

Figure 7:
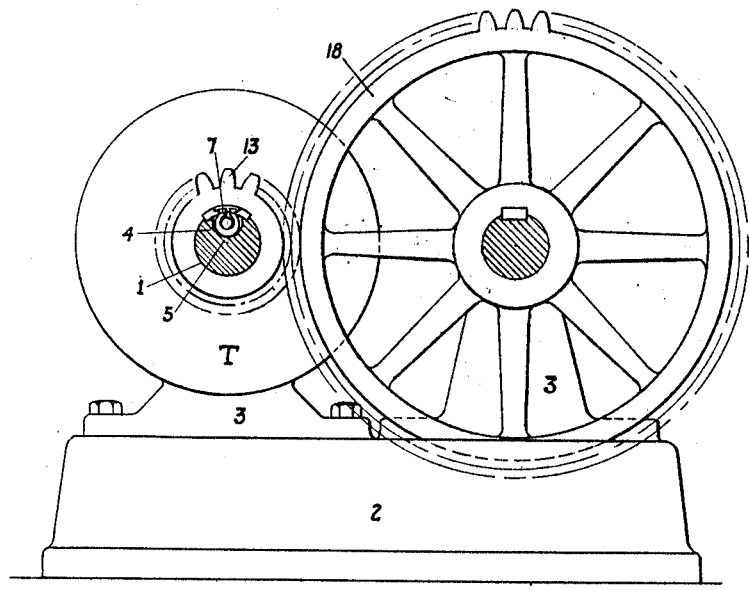

Fig. 7 is an end view of Fig. 6.

Similar letters of reference designate the corresponding parts in all the figures of the drawings.

In the drawings, I have indicated a shaft, 1, in this case, for example, the drive shaft of a turbine or other source of power, T, and shown the usual bed plate, 2, therefor, on which are the usual stationary journal bearings, 3, for the journals of the shaft, 1, of the usual spur gear pinion; there being the conventional coupling, C, between the drive shaft, 1, and the turbine shaft, *t*; instead, however, of employing the usual form of pinion drive shaft, with the gear pinion fast thereon to turn therewith, I form seats, ways or recesses, 4, in the surface of the drive shaft, parallel with the axis of the shaft. The seats may be spaced apart from each other, around the surface of the shaft, as many as may be considered desirable; in the figures in the drawing, I have shown only one seat in the surface of the shaft, 1; but the showing of only one seat is merely for the sake of convenience. Instead of using the usual gear pinion, formed integrally with the drive shaft or rigidly secured thereto, to be driven thereby without turning on the shaft, I employ what I call an annular gear toothed ring, 13, mounted to turn slightly on the shaft, 1, and a spring key, 5, between the shaft and ring, to connect together the shaft and ring. The key is composed of spiral convolutions with a cross-section of material removed from each alternate coil, to leave an open slot, 6, in the coil, as shown in the drawings. The purpose of the slot is to permit the ends of the coils to be moved toward each other under sufficient pressure; upon the pressure being reduced or removed, the ends will move in a direction away from each other. The extent of movement of the sides in the directions toward and away from each other is comparatively slight and only sufficient to effect the purpose I have in mind in my invention. Opposite the slot, I have increased the amount of material at the ends of the coils to constitute shoulders, 7. In the shoulders, I form concave or rounded out seats, 8, running the length of the shoulders.

In the structure, made practically of coils, I have, in effect, formed what I call a spring key, as I have said. I place the spring key, 5, in its seat, 4, in the shaft, 1. Along the top edges of the seats, 4, I form other seats, 10, in the shaft, 1; in the seats, 10, I place what I call pressure bars, 11; one side of each bar being rounded off or convexly curved, as shown in the drawings at 12, to bear in the curved seats 8 in the spring keys 5. The depth of the seats, 10, is about half of the thickness of the bars, 11; room for the top half of the bars, 11, between the shaft, 1, and the annular ring, 13, mounted loosely on the shaft, is provided for by a seat, 14, cut in the ring. The pressure bars or pieces, 11, engage the spring key, 5, on opposite sides of the slot, 6, and communicate pressure evenly from the shaft, 1, through the spring key to the ring, 13.

Figure 1:
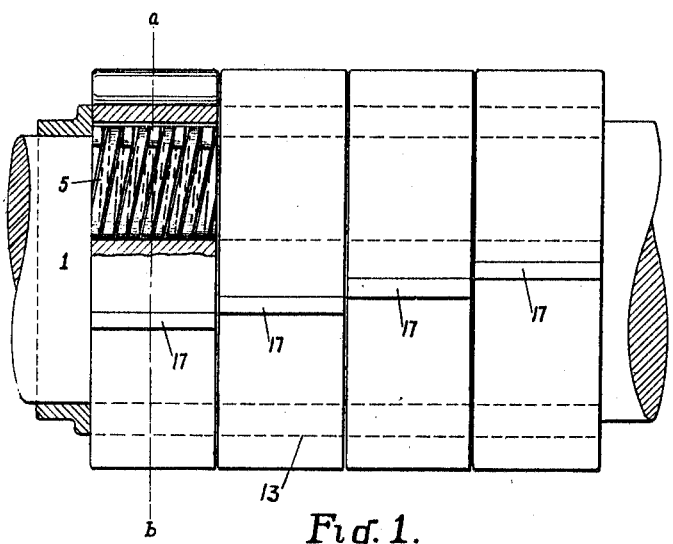
Figure 2:
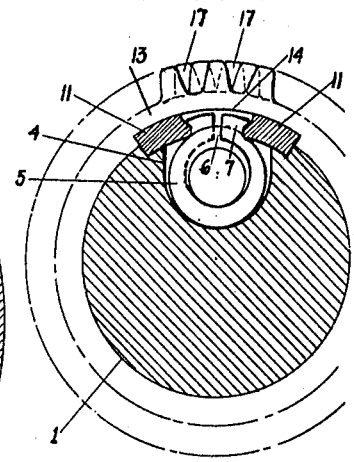
Fig. 2 is a cross-section on the line *a—b* of the Fig. 1.
Figure 3:
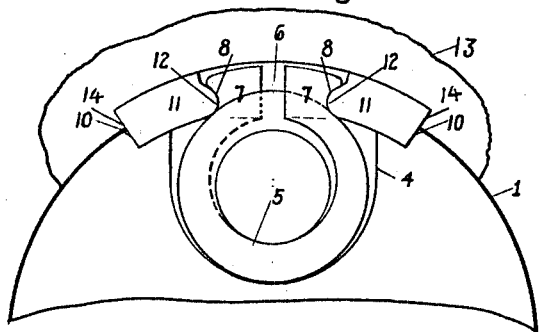
Fig. 3 is an end view of the spring key and pressure bars involved in my invention.
Figure 4:
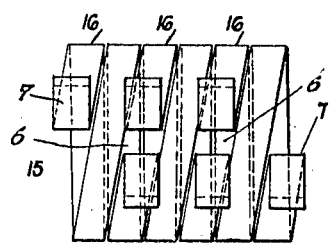
Fig. 4 is a plan view of the spring key involved in my invention.

In Fig. 4 I have shown the spring key separately, comprising a slotted cylindrical coiled spring, 15, in which the slot, 6, is formed in the alternate convolutions, 16, of the spring. In the drawings, I have shown four annular toothed rings, 13, the rings being mounted side by side and relatively positioned so as to cause their teeth to be staggered, as indicated at 17, in Fig. 1. Of course, I desire not to be limited to any particular number of rings or to the feature of staggering the gear teeth, as it is plain that my invention is applicable to any number of rings and arrangement of teeth. When my improved gear driving mechanism is assembled the gear teeth on the rings 13 will be intermeshed with the teeth of the usual gear pinion and driven wheel.

It will be understood that in the operation of my improved gear, the spring key is always under heavy compression in transmitting power. In the driving operation, the shaft, 1, will turn, and drive the pressure bar, 11, on one side of the spring key, 5, which bar will press one side of the key toward the other side thereof, thus narrowing the slot, 6, to the extent of the resistance of the convolution; however, the design is not to have the slot, 6, close in or in other words that the ends of the spring key shall not be abutted together, but that the spring key shall always act as a spring between the drive shaft and the toothed rings 13. If for any reason the drive shaft and shaft of the driven gear wheel are out of line at some time in operation or the teeth of the rings and the teeth of the driven wheel also out of line and the stagger of the teeth on the rings altered in effect, it merely means that one or more of the rings are under more pressure than another or some other rings, and when the pressure on those particular rings is reduced, they will be returned to their normal relative position by the back pressure of the spring keys; in brief, the whole face of the pinion gear as constituted of toothed rings will be free at all times to adjust and accommodate itself automatically to any irregularities of the faces of the intermeshing teeth, the displacement of the staggered relation of the teeth on the rings and the non-alinement of the shafts.

This present invention is designed as an improvement upon the inventions patented to me in the patents numbered 965,408, July 20, 1910, and 1,234,213, July 24, 1917. Of course, it is my intention not to limit my present invention by my description and showing of it in the application for the patent; but on the contrary, to include within its scope all devices which may be held to be the mere equivalent of my invention.

Having described and shown means for carrying out my invention, what I claim and desire to secure is:

1. In a toothed gear power transmission, a combination comprising a drive shaft, and a gear pinion loosely mounted thereon, to turn thereon, the shaft and pinion having key seats therein, a resilient tubing in the seats, connecting the shaft and pinion together, the tubing comprising spiral convolutions, each alternate coil being open slotted, constituting a resilient member between the shaft and gear pinion.

2. In a toothed gear power transmission, a combination comprising a drive shaft, and a gear pinion loosely mounted thereon, the shaft and pinion having key seats therein, a resilient tubing in the seats, connecting the shaft and pinion together, the tubing comprising spiral convolutions, each alternate coil being slotted longitudinally to form an open slot when the coils are assembled together, the ends of the convolutions being shouldered to effect an engagement between tubing, the shaft and the gear pinion.

3. In a toothed gear power transmission, a combination comprising a drive shaft, and a gear pinion loosely mounted thereon, to turn thereon, the shaft and pinion having key seats therein, a resilient tubing in the seats, the tubing comprised of spiral convolutions, each alternate coil being slotted longitudinally to form an open slot, the sides of the convolutions at their ends being shouldered, and pressure bars in the seats engaging the shoulders and the shaft and pinion, to effect a connection between the shaft, the pinion and the tubing.

4. In a toothed gear power transmission, a combination comprising a drive shaft, and a gear pinion loosely mounted thereon, to turn thereon, the shaft and pinion having key seats therein, a resilient tubing in the seats, the tubing comprised of spiral convolutions, each alternate coil slotted longitudinally to form an open slot, the sides of the convolutions at their ends being shouldered, the shoulders having grooves therein, pressure bars between the shaft and pinion, one side of the bars engaging the grooves in the shoulders and the other side the shaft and pinion.

5. In a toothed gear power transmission, a combination comprising a drive shaft, and a gear pinion losely mounted thereon, to turn thereon, the shaft and pinion having key seats therein, a resilient tubing in the seats, connecting the shaft and pinion together, the tubing comprised of spiral convolutions, each alternate coil being slotted longitudinally to form an open slot, the sides of the convolutions at their ends being shouldered, the shoulders having rounded grooves therein, pressure bars in the seats between the shaft and pinion, one side of the bars being rounded to engage the grooves in the shoulders.

In testimony whereof, I have signed my name to this specification.

JESSE W. RENO.

Copies of this patent may be obtained for five cents each, by addressing the "Commissioner of Patents, Washington, D. C."